(12) United States Patent
Christoffel et al.

(10) Patent No.: US 6,715,841 B2
(45) Date of Patent: Apr. 6, 2004

(54) DEVICE, PARTICULARLY A LOCKING DEVICE FOR A VEHICLE SEAT

(75) Inventors: Thomas Christoffel, Herschweiler-Pettersheim (DE); Martin Kraus, Katzenbach (DE); Kadir Yasaroglu, Kaiserslautern (DE); Peter Müller, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/337,478

(22) Filed: Jan. 7, 2003

(65) Prior Publication Data

US 2003/0102709 A1 Jun. 5, 2003

Related U.S. Application Data

(63) Continuation of application No. PCT/EP02/03207, filed on Mar. 22, 2002.

(30) Foreign Application Priority Data

Mar. 29, 2001 (DE) .......................................... 101 15 667

(51) Int. Cl.$^7$ ................................................ A47C 31/00
(52) U.S. Cl. ..................... 297/463.1; 297/335; 384/537
(58) Field of Search ................................ 297/335, 336, 297/463.1, 898.057; 384/537; 292/201, 216, DIG. 23

(56) References Cited

U.S. PATENT DOCUMENTS

| | | | | |
|---|---|---|---|---|
| 3,678,535 A | * | 7/1972 | Charles ........................ | 16/2.1 |
| 4,765,682 A | | 8/1988 | Satoh | |
| 4,883,319 A | * | 11/1989 | Scott ........................ | 297/354.1 |
| 5,301,414 A | * | 4/1994 | Gautheron .................... | 29/451 |
| 5,452,938 A | | 9/1995 | Ernst | |
| 5,562,322 A | * | 10/1996 | Christoffel ............... | 296/65.03 |
| 6,022,166 A | * | 2/2000 | Rogers et al. ........... | 403/322.4 |
| 6,234,574 B1 | * | 5/2001 | Hoshihara et al. .......... | 297/336 |
| 6,579,012 B2 | * | 6/2003 | Brandenstein et al. ...... | 384/585 |

FOREIGN PATENT DOCUMENTS

| | | |
|---|---|---|
| DE | 44 05 870 A1 | 8/1995 |
| DE | 100 01 659 A1 | 7/2000 |
| EP | 0 952 288 A1 | 10/1999 |
| GB | 2 345 723 A | 7/2000 |
| WO | WO 99/51456 | 10/1999 |

* cited by examiner

*Primary Examiner*—Peter M. Cuomo
*Assistant Examiner*—Joseph Edell
(74) *Attorney, Agent, or Firm*—Alston & Bird LLP

(57) ABSTRACT

In a device, particularly a locking device (11) for a vehicle seat, with at least one casing component (13) and at least one bearing (15) for bearing at least one pivotable element (23), the bearing (15) is tooled by plastic transformation as a first draw-through (15) in the first casing component (13).

23 Claims, 3 Drawing Sheets

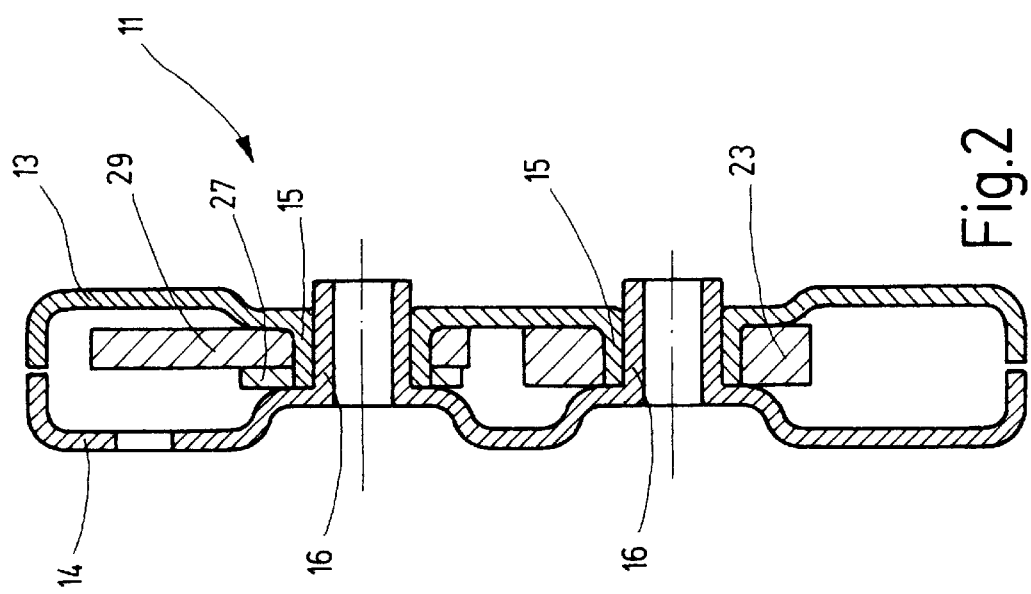
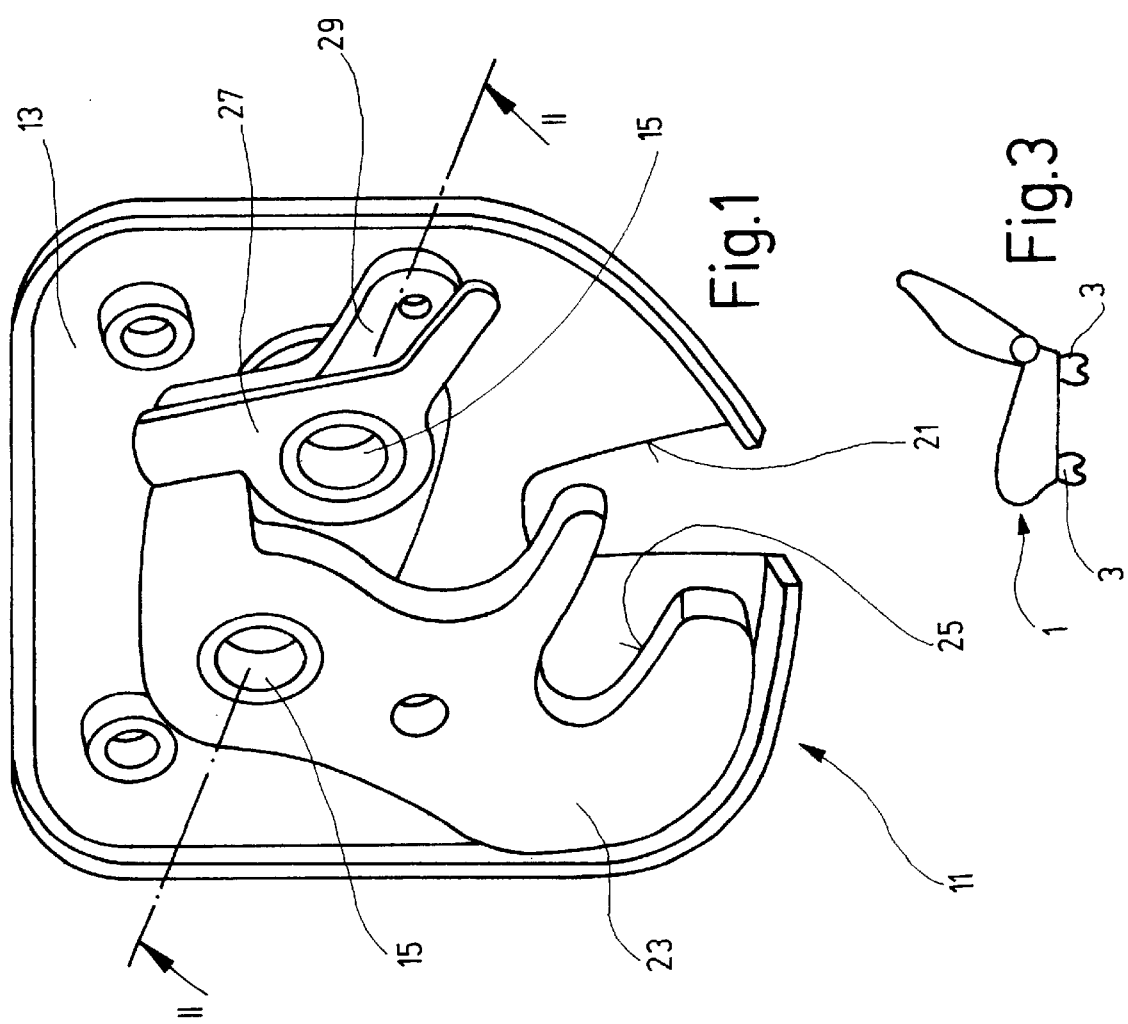

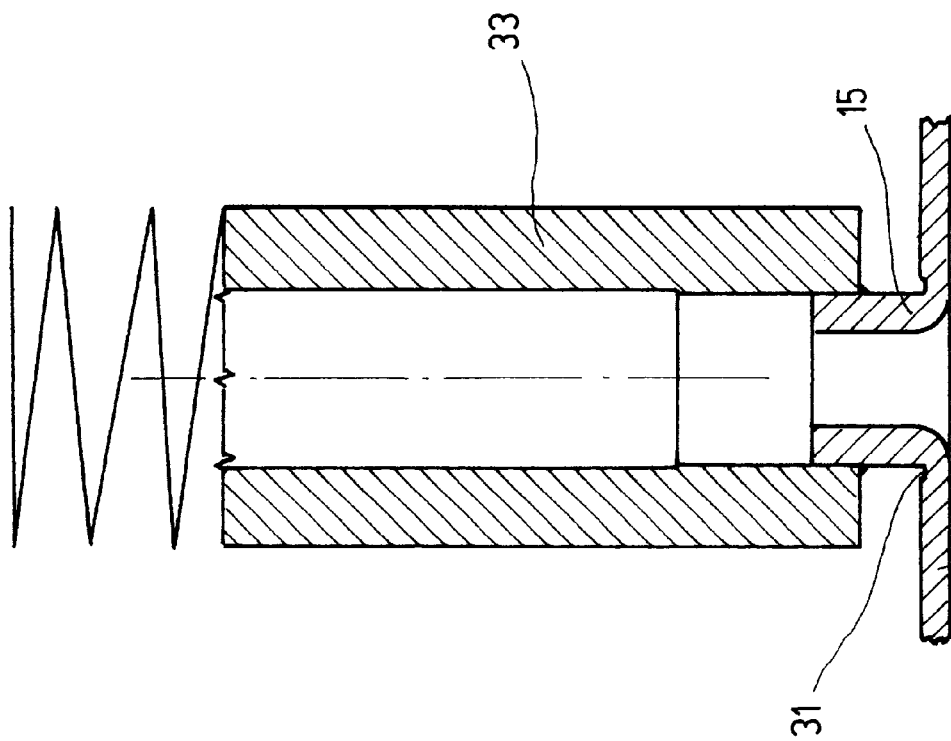
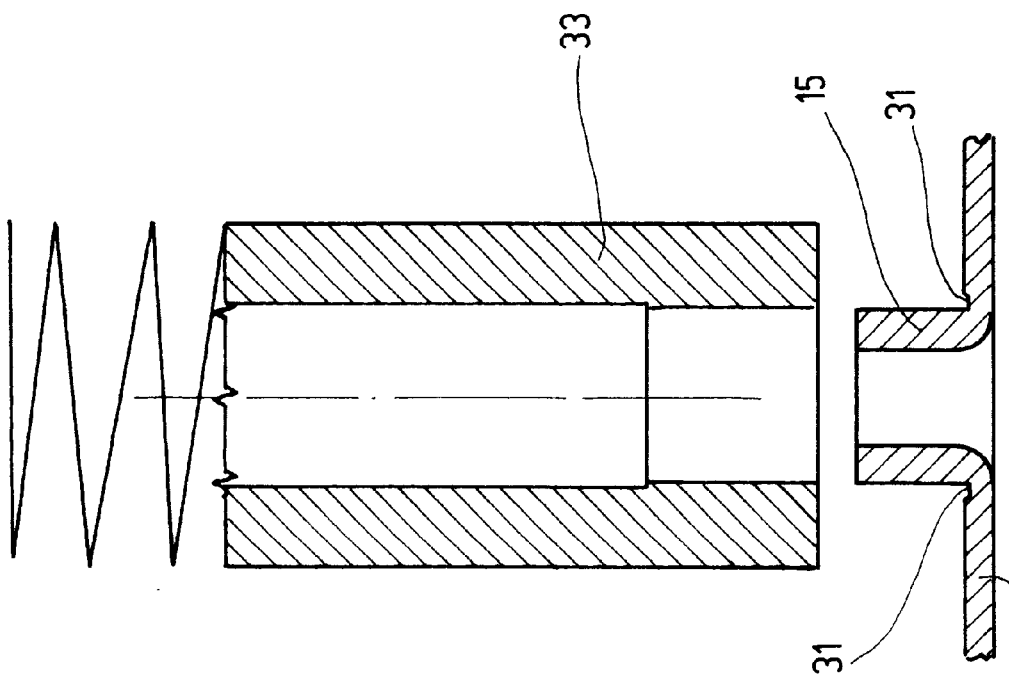

DEVICE, PARTICULARLY A LOCKING DEVICE FOR A VEHICLE SEAT

CROSS-REFERENCE TO RELATED APPLICATION

This is a continuation of PCT/EP02/03207, which was filed Mar. 22, 2002, published in German, and is entirely incorporated herein by reference.

BACKGROUND OF THE INVENTION

The present invention relates to a device, particularly a locking device for a vehicle seat, having at least one a casing component and a bearing for bearing a pivotable element.

A known device of this type serves as a locking device for a vehicle seat possessing several pawls, locks and cams that are pivotable relative to one another. Bearings are in the shape of bearing bolts mounted at well-defined intervals on a support which also has the function of a casing component. In order to ensure faultless use, the components used must be tooled and mounted with precise tolerances. Calibration is possible only to a limited extent.

BRIEF SUMMARY OF THE INVENTION

One aspect of the present invention is the provision of an improved device, particularly a locking device for a vehicle seat, and associated methods. According to this aspect, the device has at least one first casing component and at least one bearing for bearing at least one pivotable element, with the bearing being produced as a first draw-through in the first casing component by plastic transformation. For example, the draw-through is a drawn-through portion of the first casing component, with the drawn-through portion having been produced by plastic transformation in the first casing component.

By virtue of the fact that the bearing is shaped as a first draw-through produced by plastic transformation in the first casing component, the number of the required components and thus the assembly time is reduced, as no bearing bolts are required. Since fewer components and a lesser number of assembly steps are necessary, a reduction of total tolerances can also be achieved. The presence of the draw-throughs also increases the stability in this area approximately two to threefold, so that a base material of lesser quality may be used. In addition to pivotably supported elements, other components, such as casing components, may also be supported on a draw-through.

In a preferred embodiment, two casing components are connected by draw-throughs inserted into one another in a nested manner. The first-draw-through, for example, has two functions, in that it bears the pivotably supported element on its outer side and receives a second draw-through on its inner side for bearing purposes (or, from a different point of view, it bears on the second draw-through with its inner side), i.e. the first draw-through serves as a bearing for the mobile element and for positioning and bearing another casing component. Such a multiple function reduces the number of components and thereby the assembly costs.

The draw-throughs preferably also serve to support and connect casing components on or with a structure such as the foot of a vehicle seat. In the case of the preferred nested arrangement of the draw-throughs, the second draw-through also has two functions, in that it internally supports the first draw-through with its outer side and receives a fixation screw or similar element through its interior. For the play free bearing of the elements in an axial direction and/or for tightly joining the edges of the casing components connected by the above-described nesting, an adapted axial length of draw-throughs is advantageous.

If greater demands are made on the interaction of the components, calibration of the draw-throughs is advantageous, with the draw-throughs being given precise outer or inner diameters by way of female and male dies. Through this process one obtains better tolerances than with the initial tooling of the draw-throughs, allowing a precise interaction of the elements of the device. A preferable zone for receiving material in the transition area between the draw-through and the casing component can take up the excess material during calibration, allowing precise axial tolerances to be maintained. Calibration may also give a different shape to draw-throughs with originally ring-shaped profiles.

The invention can be used in a locking device in which, for safety reasons, the elements must interact securely, i.e. in which minimal tolerances are of importance. However, it may also be used in another device, particularly in a vehicle seat.

BRIEF DESCRIPTION OF THE DRAWINGS

The invention is explained in greater detail below with reference to an exemplary embodiment illustrated in the drawing, in which:

FIG. 1 is a partial perspective view of the exemplary embodiment without a second casing element, FIG. 2 is a section through the exemplary embodiment taken along the line II—II in FIG. 1, FIG. 3 is a schematic lateral view of a vehicle seat with a locking device according to the invention, FIG. 4 is a representation of the first draw-through before calibration of the outer diameter, FIG. 5 is a representation of the first draw-through during calibration of the outer diameter.

DETAILED DESCRIPTION OF THE INVENTION

Figure 7:
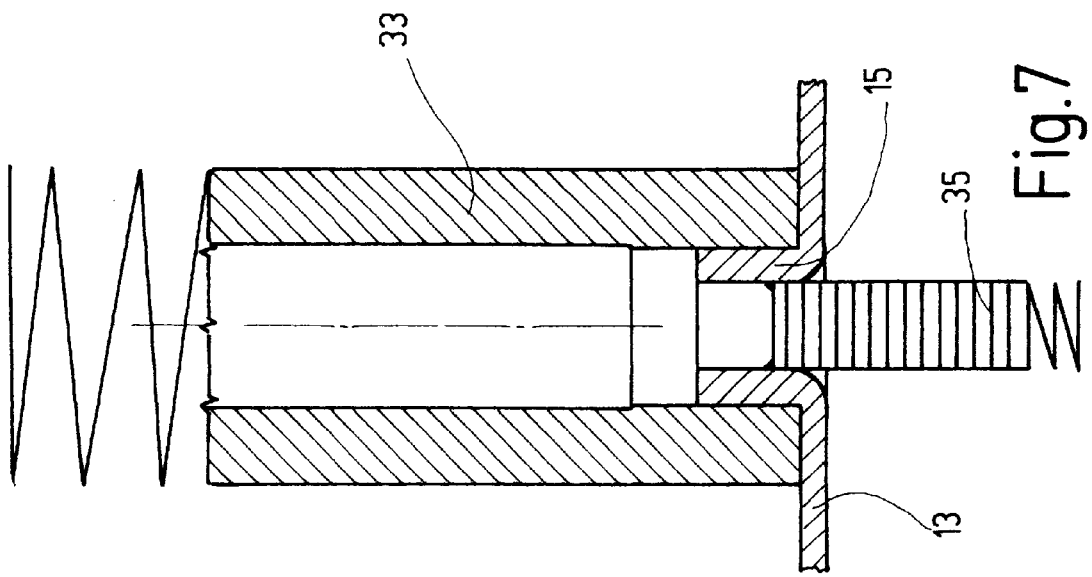
FIG. 7 is a representation of the first draw-through during calibration of the inner diameter.

A vehicle seat 1 is designed for the second or third row of seats in a motor vehicle, particularly in a so-called van. For multiple, easily performable rearrangements of the interior of the motor vehicle, the vehicle seat 1 is mounted by way of two pairs of feet 3 on the vehicle structure. Preferably, both pairs of feet 3 possess a locking device 11, which will be described in detail later on, by which they are secured by way of bolts to the vehicle floor.

The locking device 11 has a first casing component 13 and a second casing component 14, both of which are made of sheet metal by way of plastic transformation and consist essentially of a flat basic form with a raised rim. On the inside of the first casing component 13, at a defined distance from one another, there are two first tube-shaped draw-throughs 15 (e.g., drawn-through portions of the first casing component 13) protruding vertically from the first casing component 13. In an analogous manner, on the inner side of the second casing component 14, there are, positioned at an identical distance, two vertically protruding second tube-shaped draw-throughs 16 (e.g., a drawn-through portions of the second casing component) having a lesser diameter that the first draw-throughs 15.

When assembling the locking device 11, the two casing components 13 and 14 are fitted together with the draw-throughs 15 und 16, which are facing each other, in such a way that the second draw-throughs 16 are inserted into the hollow first draw-throughs 15 until the two casing components 13 and 14 are completely joined. The second draw-throughs 16 then protrude with their free end from the outer side of the first casing component 13, i.e. beyond the side facing away from the first draw-throughs 15. The second draw-throughs 16 are then connected to the first casing 13 through wobble riveting, for example. The two casing components 13 and 14 then form an almost closed casing having a hole 21, which is for receiving a bolt, on the lower side.

One of the two first draw-throughs 15 serves as a bearing for a pivotable pawl 23 protruding with a hook jaw 25 from the casing made up by two casing components 13 and 14, in the area of the bolt hole 21. The pawl 23 serves to secure the seat to the floor in a releasable manner with the aforementioned bolt. The other one of the two draw-throughs 15 serves as a bearing for a spring-loaded pivotable clamping cam 27, which maintains the pawl 23 in its locked position, and at the same time it functions as a bearing for a pivotable catching cam 29, which prevents the pawl 23 from opening in the event of a crash and is pivoted back before unlocking the pawl 23. Both hollow second draw-throughs 16 can be used for fastening the locking device 11 or as a bearing.

In order, on the one hand, for the pawl 23, the clamping cam 27 and the catching cam 29 to function securely and, on the other hand, to connect the two casing components 13 and 14 through the draw-throughs 15 and 16, the inner and outer diameters of the draw-throughs 15 and 16, as well as the distance between them, must be tooled within certain tolerances. If greater demands are made on the interaction of the components, calibration of the draw-throughs 15 and 16 is advantageous, so that only small tolerances will remain. The following is an exemplary description of the calibration of a first draw-through 15.

Figure 6:
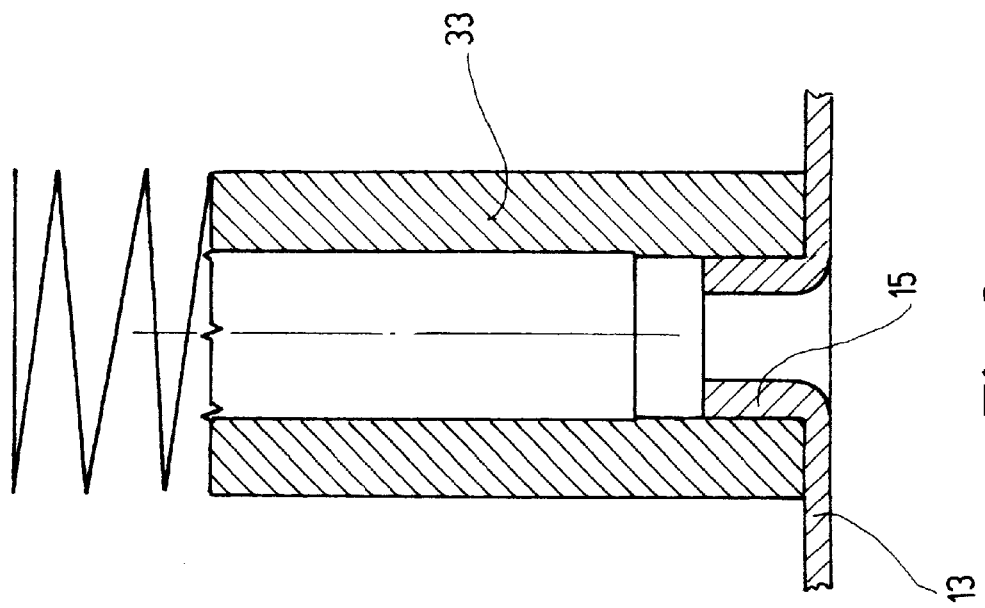
FIG. 6 is a representation of the first draw-through after calibration of the outer diameter.

For example, the first draw-through 15 can be made with the initial external dimension being at the upper end of the tolerance and the initial inner measure being at the lower end of the tolerance. In the transition area towards the flat area of the first casing component 13, there is a groove-like recess 31 which, for example, surrounds the first draw-through in a ring-like manner. In order to calibrate the outer diameter of the first draw-through 15, a hollow-cylindrical female die 33 with a precise inner diameter is pushed from the inside towards the clamped first casing component 13 (FIG. 4) and over the first draw-through 15 (FIG. 5) until it sits against the first casing component 13 (FIG. 6). In this process, the first draw-through 15 is transformed in such a manner that its outer diameter, with a small tolerance, corresponds exactly to the inner dimension of the female die 33. The excess material is pushed into the recess 31 destined to receive the material, so that calibration occurs along the entire length of the first draw-through 15.

Following this, a cylindrical male die 35 with precise outer dimensions, whose surface is in perfect alignment with the female die 33, is pushed from the outside towards the clamped first casing component 13 and through the first draw-through 15 (FIG. 7) until it comes to sit against the first casing component 13. By cutting off the excess material, the first draw-through 15 is then plastically transformed in such a way that its inner diameter, with a small tolerance, corresponds exactly to the outer dimension of the male die 33. The possibly remaining excess material at the front is removed by shaving from the front edge of the free end of the first draw-through 15. The calibration with female die 33 and male die 35 can also be performed in the opposite sequence.

The other first draw-through 15 is calibrated in the same manner with perfectly aligned dies working parallel to each other. Alternatively, the tool can include a pin possessing a precise diameter, at a precise distance from the female die 33 and the male die 35, on which the draw-through 15 first calibrated is set in order to then calibrate the other first draw-through 15. Both two first draw-throughs 15 are then calibrated in such a way that the center axes of their inner and outer walls are perfectly aligned and the walls are perfectly equidistant from one another, and that their axial lengths correspond to the thickness of the pawl 23 and the combined thickness of the clamping cam 27 and the catching cam 29. The latter components, having corresponding precise bearing holes, are then pivotably supported on the first draw-throughs 15.

The second draw-through 16 is calibrated in an analogous manner, at least with regard to the outer diameter of the second draw-through 16 and the distance from their center axes. The outer diameter of the second draw-throughs 16 then corresponds, with the desired tolerance, to the inner diameter of the first draw-throughs 15, so as to allow a play free assembly of the two casing components 13 and 14.

In the exemplary embodiment, with a view to bearing pivotable elements, the outer wall of the first draw-throughs 15 is in the shape of a circular cylinder, with the other outer and inner walls of the draw-throughs 15 and 16 being adapted to it. However, with the calibration described above, it is also possible, depending on the demands, to give the outer and inner walls different shapes, such as a two-edged element, a hexagonal prism or an oval cylinder. This modification in the outer or inner geometry is achieved by way of one or more calibration dies of the corresponding shape which, if applicable, produce the desired contour in a determined sequence of steps.

That which is claimed:

1. A device, comprising:
    a first casing component and at least one bearing pivotably supporting at least one pivotable element, wherein:
        the bearing is a drawn-through portion of the first casing component, and
        the drawn-through portion was drawn from the first casing component such that the drawn-through portion:
            was produced by plastic transformation the first casing component,
            protrudes from a first side of the first casing component and defines a cavity that is proximate a second side of the first casing component, with the second side being opposite from the first side, and
            has opposite outer and inner surfaces, with the outer surface pivotably supporting the pivotable element; and
    a second casing component, wherein the first and second casing components are mounted so that the first and second casing components are each part of a casing that is almost closed, and the pivotable element is in the casing.

2. A device according to claim 1, wherein the second casing component is supported by the first casing component.

3. A device according to claim 2, wherein:
    the drawn-through portion is a first drawn-through portion,
    the element pivotably supported by the first drawn-through portion is a first element, and
    the device further comprises a second drawn-through portion of the first casing component, wherein the second drawn-through portion was drawn from the first casing component such that the second drawn-through portion was produced by plastic transformation in the first casing component, and the second drawn-through portion is a predetermined distance from the first drawn-through portion and supports at least a second element that is for interacting with the first element.

4. A device according to claim 2, wherein the drawn-through portion has a length which corresponds to:
   a thickness of the element pivotably supported by the drawn-through portion, or
   a sum of thicknesses of a plurality of elements supported by the drawn-through portion, wherein the plurality of elements supported by the drawn-through portion includes the element pivotably supported by the drawn-through portion.

5. A device according to claim 2, wherein the second casing component is supported by the drawn-through portion.

6. A device according to claim 5, wherein:
   the drawn-through portion is a first drawn-through portion,
   the element pivotably supported by the first drawn-through portion is a first element, and
   the device further comprises a second drawn-through portion of the first casing component, wherein the second drawn-through portion was drawn from the first casing component such that the second drawn-through portion was produced by plastic transformation in the first casing component, and the second drawn-through portion is a predetermined distance from the first drawn-through portion and supports at least a second element that is for interacting with the first element.

7. A device according to claim 5, wherein the second casing component comprises at least one drawn-through portion, and the drawn-through portion of the second casing component was drawn from the second casing component such that the drawn-through portion of the second casing component was produced by plastic transformation in the second casing component.

8. A device according to claim 7, wherein:
   the drawn-through portion is a first drawn-through portion,
   the element pivotably supported by the first drawn-through portion is a first element, and
   the device further comprises a second drawn-through portion of the first casing component, wherein the second drawn-through portion was drawn from the first casing component such that the second drawn-through portion was produced by plastic transformation in the first casing component, and the second drawn-through portion is a predetermined distance from the first drawn-through portion and supports at least a second element that is for interacting with the first element.

9. A device according to claim 7, wherein:
   the element pivotably supported by the drawn-through portion of the first casing component is a first element, and
   the device further comprises at least a second element that is for interacting with the first element and is supported by the drawn-through portion of the second casing component.

10. A device according to claim 7, wherein:
    the drawn-through portion of the first casing component bears upon the drawn-through portion of the second casing component,
    the cavity of the drawn-through portion of the first casing component is a hollow interior, and
    the drawn-through portion of the second casing component extends into the hollow interior of the drawn-through portion of the first casing component.

11. A device according to claim 10, wherein the first and second casing components are connected to one another by virtue of the drawn-through portion of the second casing component extending the drawn-through portion of the first casing component such that the drawn-through portion of the second casing component is connected to the first casing component.

12. A device according to claim 1, wherein:
    the drawn-through portion is a first drawn-through portion,
    the element pivotably supported by the first drawn-through portion is a first element, and
    the device further comprises a second drawn-through portion of the first casing component, and the second drawn-through portion was drawn from the first casing component such that the second drawn-through portion was produced by plastic transformation in the first casing component, with the second drawn-through portion being a predetermined distance from the first drawn-through portion and supporting at least a second element that is for interacting with the first element that is pivotably supported by the first drawn-through portion.

13. A device according to claim 1, wherein the drawn-through portion has a length which corresponds to a thickness of the element pivotably supported by the drawn-through portion.

14. A device according to claim 1, wherein the drawn-through portion has a calibrated, precise diameter formed by plastically transforming the drawn-through portion with at least one die.

15. A device according to claim 14, wherein the first casing component includes a zone that is located in a transition area which is proximate both a base of the drawn-through portion and a flat area of the first casing component, and the zone contains excess material produced during the plastically transforming of the drawn-through portion.

16. A device according to claim 1, wherein the drawn-through portion is a first drawn-through portion having a calibrated, precise diameter formed by plastically transforming the first drawn-through portion with aligned dies, and the device further comprises a second drawn-through portion that was produced by plastic transformation, is calibrated, and is positioned at a precise distance from the first drawn-through portion.

17. A device according to claim 1, wherein the device is mounted to, and thereby in combination with, a vehicle seat.

18. A device according to claim 1, wherein the device is a locking device for a vehicle seat.

19. A device according to claim 1, wherein the element pivotably supported by the drawn-through portion is one of a plurality of elements supported by the drawn-through portion, and the drawn-through portion has a length which corresponds to a sum of thickness of the plurality of elements.

20. A device according to claim 1, wherein the drawn-through portion has a length which corresponds to:
    a thickness of the element pivotably supported by the drawn-through portion, or
    a sum of thicknesses of a plurality of elements supported by the drawn-through portion, wherein the plurality of elements supported by the drawn-through portion includes the element pivotably supported by the drawn-through portion.

21. A device according to claim 1, wherein the drawn-through portion defines a length, and the drawn-through portion defines a uniform outer diameter along the length.

22. A device according to claim 21, wherein the cavity is a hollow interior of the drawn-through portion, and the hollow interior defines a uniform interior diameter along the length.

23. A device according to claim 1, wherein the cavity is open at each of opposite ends of the drawn-through portion.

* * * * *